United States Patent
Mago nee Karacsony et al.

[11] 3,904,633
[45] Sept. 9, 1975

[54] LYSERGIC AMIDES

[75] Inventors: Erzebet Mago nee Karacsony; Tibor Balogh; Emilia Uskert nee Dievald; Jozsef Borsi; Lajos Wolf, all of Budapest, Hungary

[73] Assignee: Richter Gedeon Vegyeszeti Gyar RT, Budapest, Hungary

[22] Filed: Feb. 5, 1973

[21] Appl. No.: 329,606

[52] U.S. Cl........... 260/285.5; 260/268 PE; 424/261
[51] Int. Cl............................................. C07d 43/20
[58] Field of Search................... 260/285.5, 268 PE

[56] References Cited
UNITED STATES PATENTS

| | | | |
|---|---|---|---|
| 2,997,470 | 8/1961 | Ploch............................. | 260/285.5 |
| 3,085,092 | 4/1963 | Hofmann et al................ | 260/285.5 |
| 3,218,324 | 11/1965 | Hofmann et al................ | 260/285.5 |
| 3,583,992 | 6/1971 | Hofmann et al................ | 260/285.5 |
| 3,592,816 | 7/1971 | Troxler et al.................... | 260/285.5 |

OTHER PUBLICATIONS
Swinehart, Organic Chemistry: An Experimental Approach; 1969; p. 316.

*Primary Examiner*—Donald G. Daus
*Assistant Examiner*—Mary C. Vaughn

[57] ABSTRACT

Lysergic acid amides of the general formula I

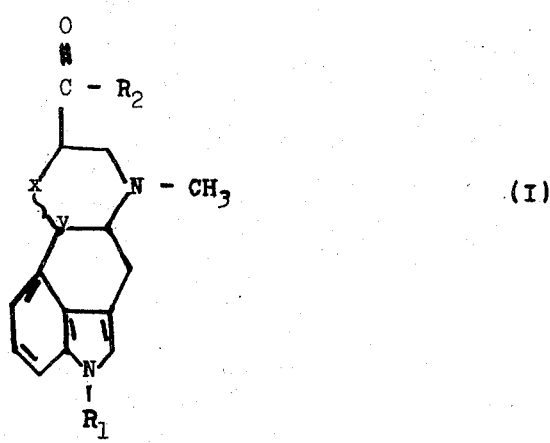

(I)

wherein
xy represents a —CH=C— or —CH$_2$—CH— group,
R$_1$ represents a hydrogen atom or a methyl group, and
R$_2$ represents an aminoalcohol, amino acid ester, alkylamine, arylamine, substituted arylamine or substituted heterocyclic group,
were prepared by reacting an active lysergic acid ester of the general formula II

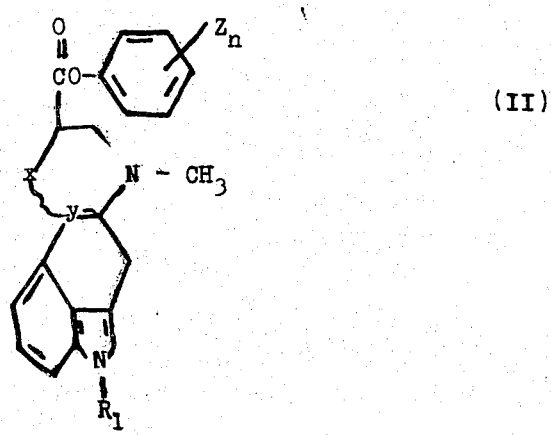

(II)

wherein xy and R$_1$ have the same meanings as defined above, Z represents hydrogen and/or halogen and/or a nitro group, and n is an integer of 1 to 5, with a compound containing a primary or secondary amino group.

These products possess valuable pharmacological properties, such as antiserotonine and central depressive activities.

2 Claims, No Drawings

LYSERGIC AMIDES

This invention relates to novel lysergic amides having the general formula I

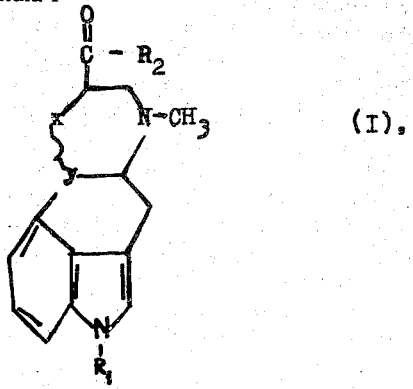

wherein $\widehat{xy}$ represents a —CH=C— or —CH$_2$—CH— group, and R$_1$ represents a hydrogen atom or a methyl group, and R$_2$ represents an aminoalcohol, amino acid ester, alkylamine, arylamine, substituted arylamine or substituted heterocyclic group, and their acid addition salts.

Furthermore, the invention relates also to a process for preparing the lysergic acid amides of the general formula I.

In the specification the term "lysergic acid" is to be interpreted in complete generality; thus it may also denote isolysergic acid, as well as the D and L antipodes or the racemic forms of the acids. The R$_2$ group of the compounds having the general formula I can similarly be derived from optically active or inactive substituted amines.

It is well known that lysergic amides are compounds of great medical importance. Thus, e.g. all of the ergot alkaloides occurring in the nature are lysergic amides. The semisynthetic processes starting from lysergic acid relate, in the majority of the cases, to the preparation of lysergic amides and lysergic alkanolamides, since these compounds may broaden the therapeutical applicability of the lysergic acid derivatives to a great extent.

Several processes have been developed for the semisynthetic preparation of lysergic amides. The first of the widely used methods was elaborated by A. Stoll and A. Hofman (Helv. Chim. Acta 26, 944 /1943/). According to this process lysergic peptides were split to yield lysergic hydrazide, this latter was converted to lysergic azide, and this compound was used for the aclyation of different amines. A great disadvantage of this so-called azide method is, however, that it proceeds with a poor yield, and a substantial amount of byproducts is also formed.

Another known process is the so-called mixed anhydride coupling method. According to this method a mixed anhydride is formed from lysergic acid and trifluoroacetic acid (U.S. Pat. No. 2,736,728) or from lysergic acid and sulphur trioxide (German Pat. No. 1,040,560), and the obtained mixed anhydride is used for the acylation of alkanolamines. This process, however, does not allow the preparation of uniform lysergic alkanolamides.

According to another known method the acylation is carried out with lysergic halides. The preparation of the respective lysergic halides is described in Hungarian Pat. Nos. 150,425 and 151,847. These processes, however, are disadvantageous in many respects: thus, e.g. the acid chloride formation can only be carried out under extremely aggressive reaction conditions (e.g. using phosphorus trichloride as solvent and phosphorus oxychloride and phosphorus pentachloride as chlorinating agent), the obtained acid chloride contains a high amount of impurities (first of all lysergic acid, inorganic phosphorus compounds and lysergic chloride chlorinated also in the 2 position), and finally no process is known for the purification of the acid chloride. Moreover, the acylation using lysergic chloride can only be carried out with a yield of maximum 70%, and the impurities of the lysergic chloride appear also in the lysergic amides prepared in this way.

Austrian Pat. No. 216,679 describes a process for the preparation of monosubstituted lysergic amides, according to which lysergic acid and a primary amine are condensed with each other in the presence of carbodiimides. Using this reaction, however, an appreciable yield cannot be obtained, since the optically active lysergic acid almost completely converts into the racemic form in the course of the reaction.

There are still further processes known for the preparation of lysergic alkanolamides, namely the direct condensation of lysergic acid with aminoalcohols (Collection 31, 3415 /1966/), and the amidation of lysergic acid methyl ester (Collection 22, 1014 /1957/). These processes, however, require very high temperatures (190° to 200°C) and long reaction time (8 to 10 hours), and they run with extremely low yields.

This invention aims also at the elaboration of a new process for the preparation of lysergic amides, free of the disadvantages of the hitherto known methods, and capable to provide an extremely pure product with a good yield in a smooth reaction, without the formation of by-products.

The process according to the invention is based on the recognition that lysergic amides are formed in a completely pure state when active lysergic acid esters are reacted with compounds containing a primary or secondary amino group. Neither isomerization nor racemization occurs in the course of the reaction, and the synthesis proceeds with an almost quantitative yield. This process can be applied, in complete generality, for the preparation of any acid amides of lysergic acid, N-alkyl-lysergic acids, 9,10-dihydro-lysergic acid and N-alkyl-9,10-dihydro-lysergic acids, respectively.

Accordingly, this invention relates also to a novel process for the preparation of lysergic acid amides having the general formula I, wherein $\widehat{xy}$ represents a —CH=C— or —CH$_2$—CH— group, R$_1$ represents a hydrogen atom or a methyl group, and R$_2$ represents an aminoalcohol, amino acid ester, alkylamine, arylamine, substituted arylamine or substituted heterocyclic group, and their acid addition salts in which an active lysergic acid ester of the general formula II,

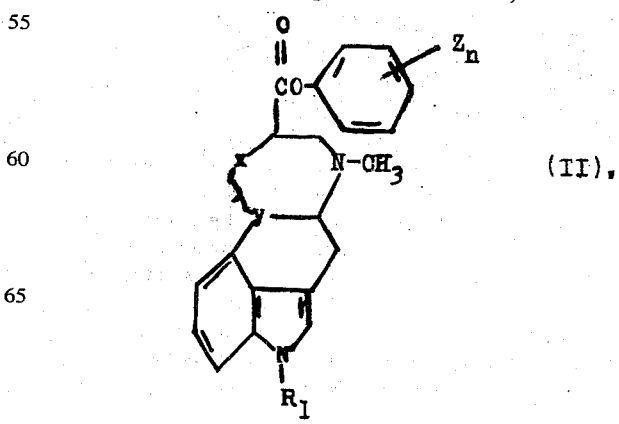

wherein x̄-y and $R_1$ have the same meanings as defined above, Z represents hydrogen and/or halogen atoms and/or nitro groups, and $n$ is an integer from 1 to 5, is amidated with a compound containing a primary or secondary amino group, and if desired, the obtained compound is converted into an acid addition salt by reacting with a pharmaceutically acceptable acid.

The process according to the invention can be used for the preparation of any known or new lysergic amides. Examples 1 to 10 describe the preparation of new lysergic amides, possessing valuable pharmacological activities.

A group of the new compounds possesses specific anti-serotonine activity. According to experiments carried out on isolated organs under in vitro conditions these compounds inhibit the smooth muscle contracting activity of serotonine, while under in vivo conditions they antagonize in low doses the oedema-inducing and circulation-influencing effects of serotonine. Another group of the new compounds exerts a significant depressive activity on the central nervous system; thus, e.g. they suppress the spontaneous motility of test animals and antagonize the stimulant activity of psychostimulant pharmacons, e.g. of amphetamine. A further group of the compounds having antidepressant activity shows effects similar to that of the tricyclic antidepressants, thus e.g. in test carried out on rats and mice they antagonize the neuroleptic properties of reserpine and potentiate the psychostimulant acivity of amphetamine. These compounds, however, differ from the tricyclic anti-depressants in that they do not increase the vasopressor activity of noradrenaline.

The compounds of the general formula II, used as starting substances in the process of the invention, can be prepared by reacting the lysergic acids of general formula III

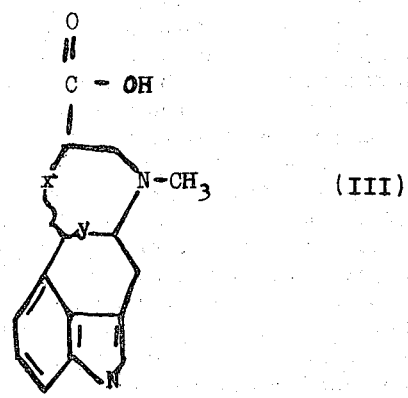

(III)

wherein R and x̄-y have the same meaning as above, with phenols of general formula IV

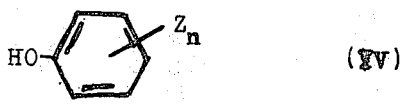

(IV)

wherein Z and $n$ have the same meaning as above, in the presence of dehydrating agents.

Among the active lysergic acid esters the pentachlorophenolates can be used with particular advantages. The reaction is preferably carried out in the presence of an inert solvent, such as tetrahydrofuran, acetonitrile, methylene chloride or dimethyl formamide. The active lysergic acid esters can be used in isolated form, but the reaction can also be carried out using the reaction mixture where these active esters were formed.

As amino reagents, any substituted amine compound can be used, such as mono- or polyhydroxylic aminoalcohols, mono- or disubstituted alkylamines, amino acids, di- or tri-peptides, monosubstituted piperazines, or arylamines, e.g. aniline and aniline derivatives, aminopyridines, etc.

The invention involves several advantages, among which the following are to be mentioned:
a. the new process can be applied in complete generality for the preparation of any substituted lysergic amides,
b. the reaction can be carried out in a simple process,
c. no by-products are formed in the course of the reaction;
d. the reaction proceeds with a high yield;
e. the compounds are of high purity grade and possess valuable pharmacological properties.

The invention is further illustrated by the aid of the following non-limiting Examples.

EXAMPLE 1

Preparation of 1-methyl-9,10-dihydro-d-lysergic acid-(4-methoxy)-anilide 5.53 g. of 1-methyl-9,10-dihydro-d-lysergic acid-pentachlorophenol ester are dissolved in 100 ml. of dry chloroform while stirring, thereafter the solution is cooled with ice water and 1.35 g. of p-methoxy-aniline dissolved in 10 ml. of chloroform are added dropwise. The solution is stirred at room temperature for one hour, thereafter it is extracted with 6×25 ml. of 1% aqueous tartaric acid solution. The aqueous extracts are combined, and the pH of the combined extracts is adjusted to 8 by adding some ml. of 10% aqueous ammonium hydroxide solution. The aqueous solution is shaken with 5×50 ml. of chloroform. The chloroform solutions are combined, dried over sodium sulphate, filtered, and evaporated in vacuo. The residue is dissolved in 10 ml. of benzene, and the benzene solution is poured into 300 ml. of dry petroleum ether. The separated precipitate is filtered off, washed with a small amount of petroleum ether, and dried in vacuo. The product is subjected to chromatography on an aluminum oxide column, using a 8:2 mixture of chloroform and benzene as eluting agent. In this way 3.56 g. (91%) of 1-methyl-9,10-dihydro-d-lysergic acid-(4-methoxy)-anilide are obtained; m.p.: 159 °C.

The starting compound, 1-methyl-9,10-dihydro-d-lysergic acid-pentachlorophenol ester is prepared as follows: 1.43 g. of 1-methyl-9,10-dihydro-d-lysergic acid free of water are suspended in a mixture of 60 ml. of abs. tetrahydrofurane and 60 ml. of abs. dichloromethane, then 1.35 g. of pentachlorophenol are added. The obtained solution is cooled while stirring to a temperature between 0 °C and 5 °C, and in small portions 1.25 g. of dicyclohexyl carbodiimide are added during 2 hours. The solution is gradually warmed to 20 °C and stirred for further 2 hours. The dicyclohexyl urea separated in crystalline form is filtered and washed with 10 ml. of tetrahydrofurane. The filtrate and the washing liquid is united and evaporated to dryness under reduced pressure. The dry residue is dissolved while hot in 5 ml. of benzene and the obtained solution is poured while stirring in 50 ml. of petroleum ether. The obtained suspension is treated with ice during 24 hours, thereafter the product is filtered, washed with 20 ml. of cold petroleum ether and dried under vacuum.

Yield: 2.0 g. (75%); $(\alpha)_D^{20} = -20°$ (c = 0.5, ethanol).

EXAMPLE 2

Preparation of d-lysergic acid-(4-methoxy)-anilide

This compound is prepared as described in Example I, starting from 5.37 g. of d-lysergic acid pentachlorophenol ester and 1.5 g. of p-methoxy-aniline. The product is obtained with a yield of 84% (3.14 g.), and melts at 127 °C.

The starting compound, d-lysergic acid pentachlorophenol ester, is prepared from d-lysergic acid and pentachlorophenol in the way as described in Example I. Yield: 62%; $(\alpha)_D^{20} = +31°$ (c = 0.5, ethanol).

EXAMPLE 3

Preparation of 9,10-dihydro-d-lysergic acid-(4-methoxy)-anilide

This compound is prepared as described in Example I, starting from 5.39 g. of 9,10-dihydro-d-lysergic acid pentachlorophenol ester and 1.5 g. of p-methoxy-aniline. 3.1 g. (82.5%) of the title compound are obtained; m.p.: 164 °C.

The starting compound, 9,10-dihydro-d-lysergic acid pentachlorophenol ester is prepared from 9,10-dihydro-d-lysergic acid and pentachlorophenol in the way as described in Example I.

Yield: 69.5% $(\alpha)_D^{20} = +3°$ (c = 0.5, ethanol).

EXAMPLE 4

Preparation of d-lysergic acid-6-(4-chloro-5-nitro-pyrimidine)-amide

This compound is prepared as described in Example I, starting from 5.37 g. of d-lysergic acid pentachlorophenol ester and 2.0 g. of 4-chloro-5-nitro-6-amino-pyrimidine. 3.2 g. (74%) of the title compound are obtained; m.p.: 240 °C.

The starting compound, d-lysergic acid pentachlorophenol ester, is prepared as described in Example 2.

EXAMPLE 5

Preparation of 9,10-dihydro-d-lysergic acid-2-(5-bromo-pyridine)-amide

The compound is prepared as described in Example 1, starting from 4.70 g. of 9,10-dihydro-d-lysergic acid-(2,4,5-trichlorophenol)-ester and 2.0 g. of 2-amino-5-bromo-pyridine. 3.4 g. (80%) of the title compound are obtained; m.p.: 132°C.

The starting compound, 9,10-dihydro-d-lysergic acid (2,4,5-trichlorophenol)-ester, is prepared from 9,10-dihydro-d-lysergic acid and trichlorophenol in the way as described in Example 1.

EXAMPLE 6

Preparation of 1-methyl-9,10-dihydro-d-lysergyl-glycyl-tyrosinol

This compound is prepared as described in Example 1, starting from 5.53 g. of 1-methyl-9,10-d-lysergic acid pentachlorophenol ester and 2.8 g. of glycol-tyrosinol. 4.5 g. (89%) of the title compound are obtained; m.p.: 152°C.

The starting compound, 1-methyl-9,10-d-lysergic acid pentachlorophenol ester, is prepared in the way as described in Example 1.

EXAMPLE 7

Preparation of 9,10-dihydro-d-lysergic acid-(3-trifluoromethyl)-anilide

This compound is prepared as described in Example 1 starting from 5.39 g. of 9,10-dihydro-d-lysergic acid pentachlorophenol ester and 2.0 g. of 3-trifluoromethyl-aniline. 3.1 g. (72%) of the title compound are obtained; m.p.: 130°C.

The starting compound, 9,10-dihydro-d-lysergic acid pentachlorophenol ester, is prepared as described in Example 3.

EXAMPLE 8

Preparation of 1-methyl-9,10-dihydro-d-lysergic acid-(3-trifluoromethyl)-anilide This compound is prepared as described in Example 1, starting from 4.05 g. of 1methyl-9,10-dihydro-d-lysergic acid-(4-nitro-phenol)-ester and 2.0 g. of 3trifluoromethyl-aniline. 2.9 g. (68%) of the title compound are obtained; m.p.: 242 °C.

The starting compound, 1methyl -9,10-dihydro-d-lysergic acid-(4-nitro-phenol)-ester, is prepared from 1-methyl-9,10-dihydro-d-lysergic acid and 4-nitrophenol in the way as described in Example 1, with the difference that the amidation is carried out in the solution of the active ester obtained after filtering of the dicyclohexyl urea.

EXAMPLE 9

Preparation of d-lysergic acid-allylamide maleate

The free base is prepared as described in Example 1, starting from 5.37 g. of d-lysergic acid pentachlorophenol ester and 1.0 g. of 1-allylamine. The free base obtained after the chromatography is dissolved in 20 ml. of hot ethanol, and 1.2 g. of maleic acid dissolved in 5 ml. of ethanol are added to the solution. The separate crystalline salt is filtered off, washed with a small amount of cold ethanol, and dried. 3.6 g. (84%) of the title compound are obtained; m.p.: 170 °C.

The starting compound, d-lysergic acid pentachlorophenol ester, is prepared as described in Example 2.

EXAMPLE 10

Preparation of 1methyl-9,10-dihydro-d-lysergic acid-allylamide

This compound is prepared as described in Example 1, starting from 5.53 g. of 1-methyl-9,10-dihydro-d-lysergic acid pentachlorophenol ester and 1.0 g. of 1-allylamine. 3.1 g. (96%) of the title compound are obtained; m.p.: 189°C.

The starting compound, 1-methyl-9,10-dihydro-d-lysergic acid pentachlorophenol ester, is prepared as described in Example 1.

EXAMPLE 11

Preparation of d-lysergic acid-2-(1-hydroxy-butane)-amide-maleate

This compound is prepared as described in Example 9, starting from 5.37 g. of d-lysergic acid pentachlorophenol ester and 1.1 g. (+)-1-hydroxy-2-amino-butane. 3.85 g. (84.5%) of the title compound are obtained; m.p.: 200°C; $(\alpha)_D^{20} = +47.0°$ (c = 1.0, in water).

EXAMPLE 12

Preparation of 1-methyl-d-lysergic acid-2-(1-hydroxy-butane)-amide maleate

This compound is prepared as described in Example 9, starting from 5.51 g. of 1-methyl-d-lysergic acid pentachlorophenol ester and 1.1 g. of (+)-1-hydroxy-2-amino-butane. 4.12 g. (85%) of the title compound are obtained; m.p.: 183°C, $(\alpha)_D^{20} = +42.0°$ (c = 0.4, in water).

The starting compound, 1-methyl-d-lysergic acid pentachlorophenol ester, is prepared from 1-methyl-d-lysergic acid and pentachlorophenol in the way described in Example 1.
Yield: 68% $(\alpha)_D^{20} = +14°$ (c = 0.5, ethanol).

EXAMPLE 13

Preparation of 9,10-dihydro-d-lysergic acid-(4-β-hydroxy-propyl)-piperazide maleate This compound is prepared as described in Example 9, starting from 5.39 g. of 9,10-dihydro-d-lysergic acid pentachlorophenol ester and 1.75 g. of β-hydroxy-propyl-piperazine. 4.9 g. (93%) of the title compound are obtained; m.p.: 207 °C; $(\alpha)_D^{20} = -49°$ (c = 0.5, in 50% aqueous ethanol).

The starting compound, 9,10-dihydro-d-lysergic acid pentachlorophenol ester, is prepared as described in Example 3.

EXAMPLE 14

Preparation of 1-methyl-9,10-dihydro-d-lysergyl-ω-nitro-L-arginine methyl ester 5.53 g. of 1-methyl-9,10-dihydro-d-lysergic acid pentachlorophenol ester are dissolved in a mixture of 50 ml. of chloroform and 50 ml. of tetrahydrofurane under stirring, and 3.5 g. of L-ω-nitro-L-arginine methyl ester hydrochloride, dissolved in a mixture of 20 ml. of chloroform and 8 ml. of triethylamine, are added to the cooled solution. The reaction mixture is stirred at room temperature for 2 hours, thereafter it is extracted with 5×30 ml. of 1% aqueous tartaric acid. Thereafter one proceeds as described in Example 1. 4.2 g. (86.5%) of the title compound are obtained; m.p.: 220°C.

The starting compound, 1-methyl-9,10-dihydro-d-lysergic acid pentachlorophenol ester, is prepared as described in Example 1.

EXAMPLE 15

Preparation of d-lysergic acid dimethylamide

This compound is prepared as described in Example 1, starting from 2.7 g. of d-lysergic acid pentachlorophenol ester and 0.5 g. of dimethylamine. 1.3 g. (88%) of the title compound are obtained; $(\alpha)_D^{20} = +30°$ (in pyridine).

The starting compound, d-lysergic acid pentachlorophenol ester, is prepared as described in Example 2.

EXAMPLE 16

Preparation of d-lysergyl-L-(+)-α-aminobutyric acid methyl ester maleate 1.7 g. of L-(+)-2-amino-butyric acid methyl ester hydrochloride (m.p.: 94°-96°C; $(\alpha)_D^{20} = +21°$ /c = 5, in 20% hydrochloric acid/) are suspended in 150 ml. of chloroform, and the suspension is cooled to 10°C. 4 ml. of triethylamine are added dropwise to the stirred suspension, thereafter 5.37 g. of d-lysergic acid pentachlorophenyl ester are sprinkled to the obtained solution, and the mixture is stirred for 30 minutes. The reaction mixture is diluted with 300 ml. of chloroform, and extracted with 2×50 ml. of 1% aqueous tartaric acid. The pH of the combined aqueous extracts is adjusted to 7 to 7.5 using 10% aqueous ammonium hydroxide, and this aqueous solution is extracted with 4×50 ml. of chloroform. The organic phases are combined, dried over anhydrous magnesium sulphate, filtered, and evaporated to dryness in vacuo. The residue is dissolved in 30 ml. of hot ethanol, and 1.6 g. of maleic acid dissolved in 6 ml. of ethanol are added to this solution. The obtained suspension is cooled in ice for several hours, thereafter the precipitate is filtered off, washed with 10 ml. of ethanol, and dried in vacuo. 3.17 g. (86%) of the title compound are obtained; m.p.: 200°C (under decomposition), $(\alpha)_D^{20} = +25°$ (c = 1, in 50% aqueous ethanol).

The starting compound, d-lysergic acid pentachlorophenol ester, is prepared as described in Example 2.

EXAMPLE 17

Preparation of 1-methyl-d-lysergyl-L-(+)-α-amino-butyric acid methyl ester maleate This compound is prepared as described in Example 16, starting from 5.55 g. of 1-methyl-d-lysergic acid pentachlorophenol ester and 1.7 g. of L-(+)-2-amino-butyric acid methyl ester hydrochloride. 3.21 g. (84%) of the title compound are obtained; m.p.: 178°C (under decomposition); $(\alpha)_D^{20} = +17.3°$ (c = 1, in 50% aqueous ethanol).

The starting compound, 1-methyl-d-lysergic acid pentachlorophenol ester, is prepared as described in Example 12.

EXAMPLE 18

Preparation of d-lysergyl-1-alanine methyl ester

This compound is prepared as described in Example 1, starting from 4.82 g. of d-lysergic acid-2,4,5-trichloro-phenyl ester and 1.6 g. of 1-alanine methyl ester hydrochloride. 3.1 g. (88%) of the title compound are obtained; $( \ )_D^{20} = -64°$ (c = 1, in chloroform).

The starting compound, d-lysergic acid 2,4,5-trichlorophenyl ester, is prepared from d-lysergic acid and 2,4,5-trichlorophenol in the way as described in Example 1 with the difference that the amidation is carried out in the solution of the active ester obtained after filtering off the dicyclohexyl urea.

What we claim is:

1. 1-methyl-d-lysergyl-L-(+)-α-amino butyric acid methyl ester or a pharmaceutically acceptable acid addition salt thereof.

2. 1-methyl-d-lysergyl-L-(+)-α-amino butyric acid methyl ester maleate.

\* \* \* \* \*